United States Patent
Schwab et al.

[11] Patent Number: 5,632,963
[45] Date of Patent: May 27, 1997

[54] PROCESS FOR THE REMOVAL OF IMPURITY ELEMENTS FROM SOLUTIONS OF VALUABLE METALS

[75] Inventors: Werner Schwab, Monheim; Ralf Kehl, Duesseldorf, both of Germany

[73] Assignee: Henkel Kommanditgesellschaft auf Aktien, Duesseldorf, Germany

[21] Appl. No.: 290,847

[22] PCT Filed: Feb. 10, 1993

[86] PCT No.: PCT/EP93/00322

§ 371 Date: Oct. 19, 1994

§ 102(e) Date: Oct. 19, 1994

[87] PCT Pub. No.: WO93/17134

PCT Pub. Date: Sep. 2, 1993

[30] Foreign Application Priority Data

Feb. 19, 1992 [DE] Germany ............... 42 04 994.6

[51] Int. Cl.⁶ ............................................. C22B 3/26
[52] U.S. Cl. ............... 423/24; 423/87; 423/139; 75/712; 75/714; 205/581
[58] Field of Search .................. 210/638, 639; 423/139, 87, 24; 204/106; 205/581; 75/712, 714

[56] References Cited

U.S. PATENT DOCUMENTS 3,900,551 8/1975 Bardoncelli et al. ............... 423/9
4,834,951 5/1989 Kehl et al. .
5,039,496 8/1991 Kehl et al. ............................ 423/24
5,174,917 12/1992 Monzyk ............................... 252/60

FOREIGN PATENT DOCUMENTS

| 0106118 | 4/1984 | European Pat. Off. . |
| 0202833 | 11/1986 | European Pat. Off. . |
| 0283740 | 9/1988 | European Pat. Off. . |
| 0302345 | 2/1989 | European Pat. Off. . |
| 0370233 | 5/1990 | European Pat. Off. . |
| 2210106 | 12/1972 | Germany . |
| 2603874 | 8/1976 | Germany . |
| 3423713 | 1/1985 | Germany . |
| 3725611 | 2/1989 | Germany . |
| 3836731 | 5/1990 | Germany . |
| 9013675 | 11/1990 | WIPO . |

*Primary Examiner*—Kathryn Gorgos
*Assistant Examiner*—Brendan Mee
*Attorney, Agent, or Firm*—Ernest G. Szoke; Wayne C. Jaeschke; Patrick J. Span

[57] ABSTRACT

A process is disclosed for removing impurity elements, such as arsenic, and if necessary antimony, iron or bismuth, from valuable metal containing, such as copper containing, strongly mineral acid solutions by way of solvent extraction with organic solutions of hydroxamic acids, and for selectively stripping the impurity elements therefrom. Antimony, iron or bismuth are stripped with complexing acids, and arsenic is stripped with an aqueous solution containing valuable metal ions at a pH value in the 1.5 to 5 range, a higher pH than the original valuable metal containing aqueous acid solution.

33 Claims, 1 Drawing Sheet

PROCESS FOR THE REMOVAL OF IMPURITY ELEMENTS FROM SOLUTIONS OF VALUABLE METALS

FIELD OF THE INVENTION

This invention relates to a process for the removal of the impurity elements arsenic and optionally antimony, bismuth or iron from solutions of valuable metals by solvent extraction and subsequent separation of the impurity elements.

In the context of the invention, "valuable metals" are understood to be the elements copper, nickel, zinc, cobalt, chromium and aluminium which may all be contaminated with arsenic. Valuable-metal solutions in the context of the invention are aqueous systems with the listed valuable metals in ionic form which, in addition to arsenic, optionally contain antimony, bismuth or iron as impurity elements in the form of their ions in varying quantities. The impurity elements are to be removed from the valuable-metal solutions so that the valuable-metal solutions may then either be directly used as such or may be subjected to electrolytic treatment to recover the valuable metals or their salts.

STATEMENT OF RELATED ART

Solutions of valuable metals are often obtained from ores by digestion or leaching with aqueous systems. Recently, however, the processing of fly dusts or the recycling of spent valuable-metal products has also played a significant role in the preparation of valuable-metal solutions. Irrespective of how the valuable-metal solutions are formed, efforts have always been made to remove the impurity elements present, namely arsenic and optionally antimony, bismuth or iron, from the solutions so that pure valuable metals are obtained. Apart from the intended improvement in the quality and quantity of the valuable metals, it is also desirable to recover the impurity elements for economic and ecological reasons.

Numerous solvent extraction processes in which arsenic and, in some cases, also antimony are removed from valuable-metal solutions are known from the prior art in connection with the electrorefining of copper. Thus, DE-A-26 03 874 describes a process for the removal of arsenic in which the aqueous electrolyte solution is contacted with an organic phase containing tributyl phosphate, the arsenic being extracted into the organic phase. It is known from EP-A-106 118 that arsenic can be removed from copper electrolyte solutions with organophosphorus compounds, such as trioctyl phosphine oxide, in organic solvents, such as kerosine. To work up the arsenic, it is proposed that aqueous hydrochloric acid or other mineral acids be contacted with the organic arsenic-containing phase. In addition, DE-A-34 23 713 describes a process for the removal of arsenic from sulfuric acid copper electrolytes in which aliphatic alcohols containing 6 to 13 carbon atoms, preferably 2-ethyl-1-hexanol, in organic phase are used as the extractants. In this process, a large part of the arsenic can be removed in six extraction cycles.

However, all the processes mentioned above are attended by disadvantages. They require an extremely high concentration of acid for efficient arsenic extraction which, in practice, is achieved by increasing the sulfuric acid concentration of the copper electrolyte solution by concentration from 100 to 250 g/l to around 500 g/l. With sulfuric acid concentrations as high as these, considerable quantities of sulfuric acid are extracted into the organic phase with the impurity elements. To remove the sulfuric acid, several washing stages have to be incorporated which involves unwanted extra expenditure. In addition, the organophosphorus extractants are not sufficiently stable at such high acid concentrations, resulting during extraction in losses of effect of the extractant and in unwanted crud formation.

The difficulties illustrated with reference by way of example to the removal of impurity elements from copper electrolyte solutions also apply to contamination by the impurity elements in aqueous solutions of the other valuable metals already listed. In individual cases, the removal of a certain impurity element may be more important than the removal of other impurity elements within the group.

The described disadvantages attending the removal of impurity elements are overcome in applicants' DE-A-37 25 611 and DE-A-38 36 731. According to these two patent applications, the impurity elements arsenic, antimony, bismuth and iron may be removed individually or successively from aqueous electrolyte solutions by a solvent extraction process in which organic solutions of hydroxamic acids are added to the aqueous mineral acid electrolyte solutions, the impurity elements are extracted and the organic phase containing impurity elements is subsequently worked up. According to DE-A-37 25 611, working up from the organic phase was carried out by sulfide precipitation of the impurity elements arsenic, antimony and bismuth. The iron remaining in the organic phase was subsequently stripped into an aqueous phase with a water-soluble complexing agent for iron, such as hydrochloric acid or oxalic acid, and recovered. In this working-up phase, the largest quantities of impurity elements are obtained in the form of sulfide filter cakes which, on the one hand, have to be worked up with considerable effort and, on the other hand, can still contain organic solvents or hydroxamic acid. In addition, the hydrogen sulfide used for sulfide precipitation also dissolves in the organic solvent so that an additional purification stage is necessary for removing the hydrogen sulfide so that the organic phase may be subsequently reused. In DE-A-38 36 731, working up of the impurity elements is modified insofar as the sulfide precipitation step is preceded by the addition of water to the organic phase laden with impurity elements, arsenic and/or antimony being stripped into the water phase, thus facilitating working up of the sulfide filter cake. Nevertheless, the disadvantages of sulfide precipitation are still encountered in this modified process. In addition, this modified process only gives aqueous arsenic solutions of low concentration, the large quantities of water making the arsenic expensive and uneconomical to work up.

BRIEF SUMMARY OF THE INVENTION

The problem addressed by the present invention was to provide a process for the removal of the impurity elements arsenic and optionally antimony, bismuth or iron from solutions of valuable metals which would avoid the disadvantages mentioned above and which, in overall terms, would provide for the technically simple, economic and continuous removal and processing of the impurity elements. In addition, at least the arsenic among the impurity elements would accumulate in the form of a highly concentrated aqueous solution in this process.

It has surprisingly been found that arsenic can be selectively stripped from the organic phase by addition of a valuable-metal solution providing this valuable-metal solution has a higher pH value than the valuable-metal solution to be freed from the impurity elements.

DETAILED DESCRIPTION AND PREFERRED EMBODIMENTS

Figure 1:
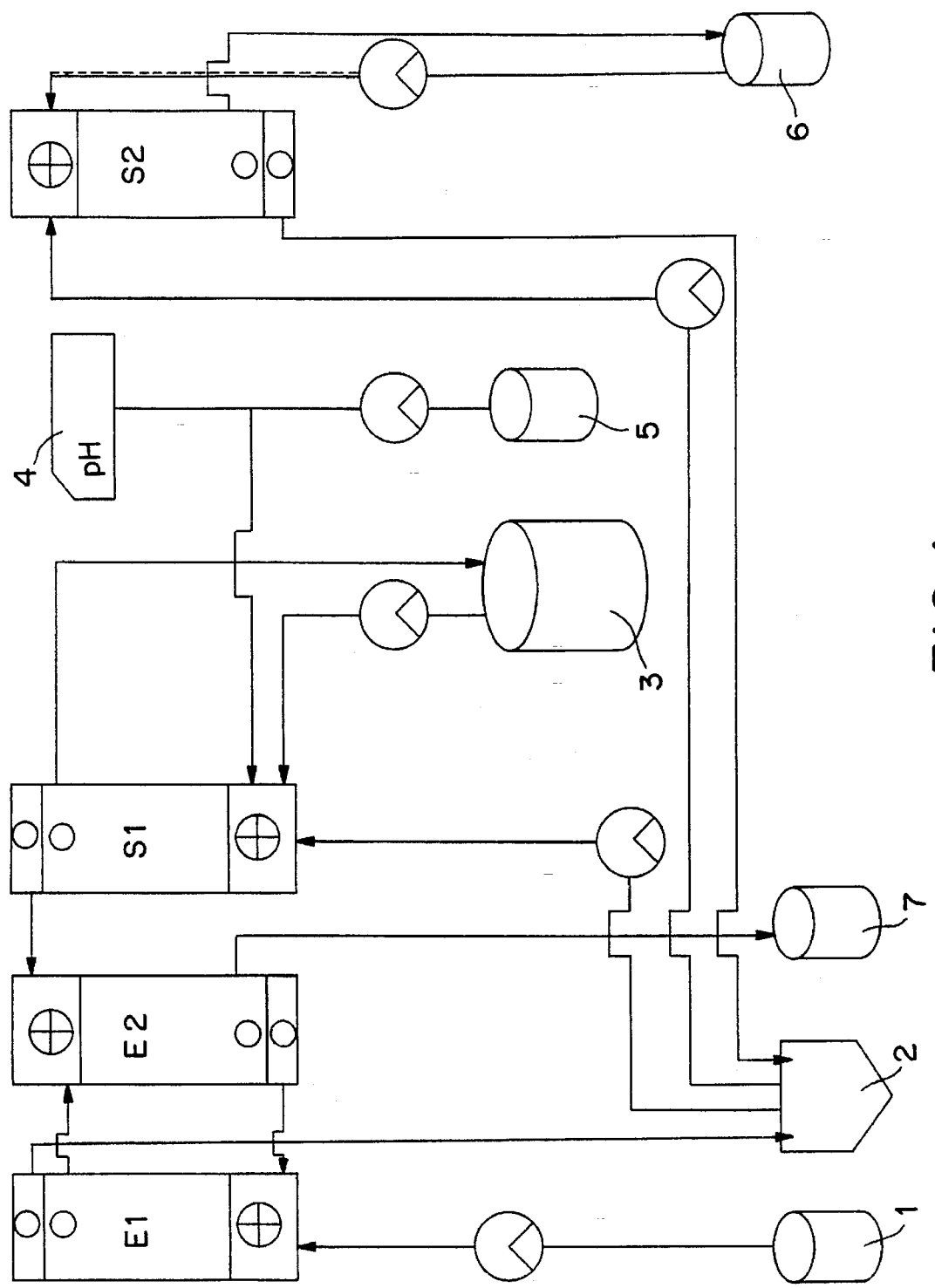
FIG. 1 is a flow sheet of a continuous process of the invention using 2 extraction stages E1 and E2, a stripping stage S1 and a second stripping stage S2.

The present invention relates to a process for removal of the impurity elements arsenic and optionally antimony, iron or bismuth from solutions of valuable metals by solvent extraction and separation of the impurity elements from one another, in which a) organic solutions of hydroxamic acids corresponding to general formula (I):

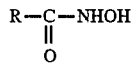

in which R is an alkyl and/or alkenyl radical containing 6 to 22 carbon atoms, a cycloalkyl radical or an aryl radical containing up to 19 carbon atoms, are added to the aqueous, strongly mineral acid valuable-metal solutions, b) the aqueous phase and the organic phase are mixed together over an adequate residence time and the phases are separated, characterized in that c) where antimony, iron or bismuth are present, they are subsequently stripped from the organic phase with aqueous acids which complex antimony, iron or bismuth and, at the same time or thereafter, d) arsenic is stripped from the organic phase with an aqueous solution containing valuable-metal ions at a higher pH value relative to a) in the range from 1.5 to 5 and e) the aqueous solutions containing impurity elements are worked up by methods known per se.

The process according to the invention falls under the general heading of solvent extraction. Solvent extraction processes are normally understood to be processes in which two liquid phases which are insoluble or substantially insoluble in one another are thoroughly contacted so that one or more components of one phase pass into the other phase. An equilibrium dependent on various external parameters is normally established in the process. Important parameters are the residence time (contacting time), temperature and pH value. Similarly to solvent extraction as defined above, stripping involves the passing of one or more components from one phase into the other phase, although the phase transfer takes place in exactly the opposite sequence to the preceding extraction. Both in extraction and in stripping, the two phases insoluble or substantially insoluble in one another are intensively mixed over a certain residence time. The phases can then be separated and each individual phase is then further treated.

The impurity elements and valuable metals are present in the solutions in the form of their ions which may occur in different degrees of oxidation in the solution. For example, the impurity element arsenic may be present in aqueous solutions in the oxidation stage (III) or the oxidation stage (V). In addition to arsenic, antimony, iron or bismuth or even various mixtures of antimony, iron and bismuth may be present as additional impurity elements.

The first step a) and the second step b) of the process according to the invention are based on the processes according to applicants' DE-A-37 25 611 and DE-A-38 36 731. As described in these two documents, organic solutions of the hydroxamic acids corresponding to general formula (I) are added to the aqueous, strongly mineral acid solutions of valuable metals. The organic solutions of the hydroxamic acids may contain one or more different hydroxamic acids corresponding to general formula (I). The substituent R in general formula (I) is preferably a linear alkyl radical from the group consisting of hexyl, heptyl, octyl, nonyl, decyl, undecyl, dodecyl, tridecyl, tetradecyl, pentadecyl, hexadecyl, heptadecyl, octadecyl, nonadecyl, eicosyl, uneicosyl or docosyl. However, R may also be a branched-chain isomer of the linear alkyl radicals mentioned. R is preferably a branched, saturated alkyl radical containing 6 to 22 and preferably 7 to 19 carbon atoms. Hydroxamic acids corresponding to general formula (I), in which R represents neo-alkyl corresponding to general formula (II):

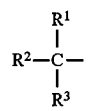

in which the sum of the carbon atoms in $R^1$, $R^2$ and $R^3$ is from 6 to 18 and preferably from 7 to 17, are most particularly preferred. The individual meanings of the substituents $R^1$ to $R^3$ is of secondary importance in this connection. Hydroxamic acids of the type in question are based on neo-alkyl carboxylic acids which are marketed, for example, under the trade name of Versatic Acid®.

In principle, the hydroxamic acids of general formula (I) may be prepared by methods known per se. Thus, DE-C-22 10 106, for example, describes the reaction of carboxylic acids with an excess of $SOCl_2$ to form the corresponding acid chloride and conversion with hydroxylamines to form the hydroxamic acid corresponding to general formula (I). RCO is the residue of the corresponding carboxylic acid.

According to the invention, the hydroxamic acids are used in the form of organic solutions. Suitable organic solvents are, for example, aliphatic, cycloaliphatic or aromatic hydrocarbons of high boiling point or mixtures thereof, fluorinated hydrocarbons, ketones or ethers of high boiling point or even mixtures of such compounds. Kerosines are preferably used.

In one embodiment of the present invention which differs from DE-A-37 25 611 and DE-A-38 36 731 which have already been repeatedly cited, modifiers known from the prior art are additionally present in the organic solution of the hydroxamic acids. Modifiers are generally compounds which either promote better or more rapid phase separation or which accelerate phase transfer of the component to be extracted and stripped. They are often one and the same product (cf. Handbook of Solvent Extraction, Wiley & Sons, New York 1983, pages 84 and 640). In the context of the invention, modifiers are intended to accelerate phase transfer of the impurity elements, preferably during stripping. Several compounds suitable for this purpose are described in the cited handbook and in European patent EP-C-202 833. Preferred modifiers are branched aliphatic alcohols, phenols and/or esters thereof, preferably long-chain branched alcohols containing 12 to 22 carbon atoms and/or esters thereof and, more preferably, the alcohols.

The valuable-metal solutions may be solutions obtained by digestion from ores or by processing of fly dusts or by recycling of spent valuable-metal products providing they contain arsenic as impurity element. The process according to the invention is particularly suitable for acidic valuable-metal electrolyte solutions from which the valuable metals are recovered in metallic form by electrolysis. The process is particularly suitable for copper electrolyte solutions, preferably aqueous, sulfuric acid copper electrorefining solutions. Copper electrorefining solutions vary in their content of impurity elements, depending on the quality of the crude copper anodes. However, only small quantities of antimony, bismuth and iron of 0.05 to 0.6 g/l are generally present. The quantities of arsenic are distinctly higher at around 5 to more than 20 g/l. In addition, the electrorefining solutions contain around 100 to 250 g/l of free acids, preferably sulfuric acid. The other valuable-metal solutions which may also be used in accordance with the invention show qualitatively and quantitatively different compositions, as known in principle from the prior art, for example from Handbook of Solvent Extraction, Wiley & Sons, New York 1983, page 734.

The pH value of these solutions is generally below zero.

The second step b) of the process according to the invention is also quite similar to applicants' two above-cited German DE-A- specifications. In this second process step, arsenic and the impurity elements optionally present are transferred from the aqueous valuable-metal solution to the organic solutions containing hydroxamic acids and optionally modifiers. At the pH values prevailing in the valuable-metal electrolyte solution, the impurity elements are almost all transferred to the organic phase. Apart from the pH value, the parameters contacting time (residence time), temperature and concentration of extractants and modifiers, if any, also play a part.

The contacting times are quite different for the various impurity elements. For example, the greater the quantity of arsenic extracted, the longer the contacting time. By contrast, for antimony, bismuth and iron, short contacting times (1 to 5 minutes) lead to extraction of the major quantity. With relatively long contacting times, the more rapidly extracted impurity elements are redisplaced by arsenic at fixed reagent concentrations. Depending on the impurity elements which are to be extracted, the contacting time for the impurity element to be extracted has to be adapted on account of the partly conflicting tendencies during extraction. If all the impurity elements are to be extracted, it is necessary to find a compromise which is best taken into account through a contacting time of 1 to 60 minutes and preferably 5 to 20 minutes.

The concentration of hydroxamic acids in the organic solutions is limited by the fact that, with high concentrations of the hydroxamic acids, viscosity increases so dramatically during charging with the impurity elements that efficient mixing of the two phases is no longer guaranteed where the process is carried out continuously. In addition, phase separation is seriously complicated by increasing viscosity. Accordingly, it is preferred to use the organic solutions of hydroxamic acids with a concentration of 0.1 to 2 moles/l of organic solution and preferably in a concentration of 0.3 to 1.0 mole/l of organic solution.

The temperature during extraction is typically in the range from 20° to 70° C. and preferably in the range from 30° to 60° C. Although extraction curves at higher temperatures show higher extraction rates for arsenic into the organic phase, the hydroxamic acids become more unstable at higher temperatures than 70° C. Since copper electrorefining solutions generally have temperatures of 50° to 60° C., the solution run off from the electrolysis cell may be directly subjected to the process according to the invention. Accordingly, a continuous procedure which no longer requires separate heating before extraction may be applied.

Finally, the ratios by volume of organic to aqueous phase also play a part, amounting to between 1:10 and 10:1, preferably to between 1.5:1 and 1:1.5 and more preferably to 1:1.

In principle, the aqueous and organic solutions are intensively mixed together in the second process step b). This may be done, for example, by continuously delivering them to a so-called mixer settler in which they are mixed together at the temperature shown and for the time shown and the phases are subsequently left to separate in the settler.

The third process step c) is only necessary when the valuable-metal solution contained one or more of the impurity elements antimony, iron or bismuth in addition to arsenic. This is the case, for example, in the monitoring or removal of impurity elements from copper electrorefining solutions. In cases such as these, an aqueous antimony-, iron- or bismuth-complexing acid is added to the organic phase for stripping. Preferred complexing acids are those known per se, such as oxalic acid, phosphonic acids, hydrochloric acid or mixtures thereof. Hydrochloric acid is particularly preferred.

The transfer of the impurity elements mentioned from the charged organic phase to the aqueous strip phase is also influenced by the parameters contacting time, temperature and concentration of the complexing agent. Considerable quantities of impurity elements are stripped after only 30 seconds. A contacting time of more than 10 minutes does not bring any clear improvement. The contacting time is preferably between 1 and 3 minutes. The temperatures during stripping are preferably in the range from 20° to 60° C. and more preferably up to 30° C. Hydrochloric acid, which is particularly preferred, leads to the complete stripping of bismuth in a concentration of only 3 moles/l of aqueous phase. However, in order efficiently to strip the impurity elements antimony and iron optionally present, it is recommended to use the particularly preferred hydrochloric acid in a concentration of 5 to 10 moles/l and preferably in a concentration of 6 to 8 moles/l. Under these conditions, the arsenic compulsorily present is stripped in only minimal quantities so that arsenic is separated with the other impurity elements, if any, under the described conditions. The ratio by volume of the organic impurity element phase to the aqueous hydrochloric acid phase may be from 1:10 to 10:1 and is preferably from 1.5:1 to 1:1.5 and, more preferably, 1:1. Stripping is carried out similarly to process step b) by intensive mixing of the phases. This may be done, for example, continuously in a mixer-settler under the described conditions.

In the fourth process step d), the phase still charged with arsenic which accumulates after phase separation after process step b) or optionally c) is stripped with an aqueous solution containing valuable metal. The valuable metals are exactly the same as those initially introduced in process step a). Accordingly, in order not to introduce any additional elements into the process as a whole, it is preferred to use valuable metals of the same type. For example, the stripping of arsenic is carried out with an aqueous solution containing copper ions if the valuable-metal solution to be extracted in process step a) was a copper solution. Now, to enable arsenic to be stripped from organic solutions with an aqueous copper solution from which it had been removed in process step a), it is absolutely essential that the pH be increased to a value of 1.5 to 5 and preferably 1.5 to 3.5. In a particularly preferred embodiment, pH values of 1.5 to 2.5 are adjusted for the stripping of arsenic with an aqueous solution containing copper ions. Since the aqueous solution becomes acidic in the stripping of arsenic, the pH value has to be readjusted with a base, preferably sodium hydroxide.

Since the process according to the invention is particularly intended for copper electrolyte solutions, aqueous solutions containing copper ions are preferably used in process step d). The concentration of copper ions in the aqueous solution is determined by the concentration of arsenic in the organic phase and must be at least equimolar for efficient stripping. However, a concentration of more than 40 g/l of aqueous phase should be avoided because poorly soluble copper compounds can be precipitated, particularly where the process is carried out continuously. For continuous stripping in process step d), the solution containing copper ions is circulated so that copper decreases and arsenic increases in concentration. Accordingly, to guarantee the efficient stripping of arsenic, the valuable metal (copper in the form of a salt) has to be re-added (restrengthened). The continuous procedure can result in the formation of highly concentrated aqueous arsenic solutions which are removed from the circuit, for example at a content of 30 g/l, and worked up. Before the arsenic solutions are removed from the circuit, it is best to circulate the solution containing copper in addition to arsenic without restrengthening so that the copper content is minimized, thus facilitating working up of the arsenic.

In overall terms, the quantity of arsenic can be influenced through the residence time and the temperature prevailing during stripping of the arsenic for a given pH value. Thus, the quantity of stripped arsenic increases with increasing contacting time. For economic reasons, it is again advisable to strike a compromise between large quantities of the stripped impurity elements and a short residence time. In principle, the contacting times may be between 1 and 60 minutes and are preferably between 5 and 30 minutes. The quantity of stripped arsenic can also be increased through increasing temperatures. The temperatures should not exceed 70° C. because of diminishing stability of the hydroxamic acid. The temperatures are preferably between 25° and 70° C. and more preferably in the range from 40° to 60° C. Stripping is carried out similarly to process steps b) and optionally c) by intensive mixing of the phases with one another. The ratios by volume of aqueous phase to organic phase are preferably in the range from 1.5:1 to 1:1.5 and, more preferably, are 1:1. Where the process is carried out continuously, it is recommended to use a mixer-settler for stripping.

After the fifth process step e), the impurity elements arsenic and optionally iron, bismuth or antimony now present in the form of an aqueous solution are worked up by methods known per se, for example by precipitation reactions, such as sulfide precipitation, resulting in the formation of poorly soluble or insoluble compounds which may be disposed of as waste, or by pH reduction which results in the formation of reusable products, such as arsenic oxide. However, the solutions may even be reused either in dilute or in concentrated form as solutions.

One of the particular advantages of the process according to the invention lies in the fact that it may readily be carried out as a continuous process. In the process according to the invention, it is important that process step c) always takes place before or at the same time as process step d). If desired, process step c) may be followed by a washing stage to remove any small quantities of complexing acid which might otherwise lead to problems in process step d). The organic phase containing valuable metal (copper) which accumulates in process step d) after phase separation is returned (circuit) to the extraction process of step a), the valuable metal (copper) again being stripped from the charged organic phase into the aqueous phase (for example copper refining electrolyte) by contact with the aqueous, strongly mineral valuable-metal solution.

In special cases, the aqueous, strongly mineral acid valuable-metal solution used in a) may contain small quantities of polymers, such as sizes, or even thiourea which are often present in copper electrorefining solutions to ensure that the valuable metal is smoothly precipitated during electrolysis. These polymers can affect the process according to the invention. Accordingly, a pretreatment stage should optionally be included in which organic solvents are added to the valuable-metal solution before extraction and the polymers are removed. Suitable organic solvents are those already described in connection with the hydroxamic acids, more particularly high-boiling kerosines.

In one embodiment of the present invention, the process according to the invention is carried out continuously, the solutions to be used in regard to type and quantity and the parameters to be observed being as stated in the foregoing description. In the continuous process (see FIG. 1), the extraction stage(s) are combined with a stripping stage S1 in the most simple embodiment. This most simple embodiment is adopted when arsenic is the only impurity element. If antimony, iron or bismuth are present as additional impurity elements in the valuable-metal solution, an additional circuit S2 has to be added for stripping. This circuit or these two circuits may be extended by preliminary purification, as already described. A continuous process is shown by way of example in FIG. 1. Two extraction stages E1 and E2 are arranged in tandem and are combined with a stripping stage S1 and if desired with a second stripping stage S2. The extractions in the extraction stages E1 and E2 are carried out on the countercurrent principle. The aqueous valuable-metal solution containing a certain quantity of arsenic and optionally antimony, iron or bismuth is pumped from the tank 1 into the extraction stage E1 where it encounters organic solutions of the hydroxamic acids pumped from tank 2 into the extraction stage 1 via the stripping stage S1 and the extraction stage E2. In the extraction stage E1 and E2, the impurity elements are extracted from the aqueous valuable-metal solution into the organic solutions with the hydroxamic acids. These organic solutions are collected in the tank 2. The organic solutions charged with the impurity elements are pumped into the stripping stage S1 if they contain arsenic as the only impurity element. In the stripping stage S1, they encounter an aqueous valuable-metal solution pumped from the tank 3. The pH value in the stripping stage S1 is constantly monitored by the pH meter 4, the pH value being adjusted to 1.5 to 5 with bases, preferably sodium hydroxide in the form of an aqueous solution from tank 5. After stripping in the stripping stage S1, the aqueous arsenic-containing solution is re-introduced into the tank 3. Accordingly, the aqueous solution containing valuable metal (copper) is circulated, preferably until the solution has reached an arsenic content of around 30 g/l, valuable metal (copper) being continuously read. After the arsenic content has been reached, the solution is removed from the circuit, optionally after further stripping circuits to minimize the copper, and worked up in known manner. The organic phase containing valuable metal is delivered to the extraction stage E1 either directly or via the extraction stage E2. In the extraction stage E1, the organic phase again encounters the aqueous solution containing valuable-metal electrolyte, the valuable metal being stripped into the aqueous solution at the pH values prevailing in E1. The aqueous valuable-metal solution (raffinate) freed or substantially freed from the impurity elements is transferred from E1 or E2 to the tank 7, thus closing the circuit after the process steps defined in claim 1 as a), b) and d) and also e).

If antimony, iron and bismuth are present as impurity elements, the organic phase charged with impurity elements is pumped from tank 2 into the stripping stage S2 before or at the same time as the stripping of arsenic in the stripping stage S1. In the stripping stage S2, the organic phase comes into contact with the described complexing acid which is pumped from tank 6 into the stripping stage S2. After stripping, the aqueous phase containing acid complexing the impurity elements antimony, bismuth and iron is re-admitted into the tank 6, i.e. is circulated. The circulation of the aqueous phase is preferably continued until a total impurity metal content of around 6 g/l is reached in the aqueous phase. The solution is then removed from the circuit and the impurity elements are worked up in known manner. The freed phase containing complexing acids is reintroduced into the circuit. The organic phase, which may still be charged with arsenic providing the stripping stage S2 is operated at the same time as the stripping stage S1, may if desired be washed with water to remove residues of complexing acids (not shown in FIG. 1) which could otherwise lead to problems in the stripping stage S1. The organic phase is then returned to the tank 2, thus closing the second stripping circuit.

EXAMPLES

Example 1

Extraction of impurity elements

The kerosine commercially available as "Escaid® 120" was added to an electrolyte solution from a copper electrorefining plant with the following composition (in g/l): 15 arsenic (As), 0.22 bismuth (Bi), 0.21 antimony (Sb), 0.18 iron (Fe), 52 copper (Cu), 17 nickel (Ni) and 180 g sulfuric acid.

Hydroxamic acid which had been prepared from a mixture of carboxylic acids corresponding to the following formula:

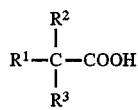

in which the sum total of carbon atoms in the alkyl radicals $R^1$ to $R^3$ is in the range from 7 to 17 (commercial product Versatic®) was dissolved in the organic solvent kerosine in a quantity of 0.5 mole per liter.

In addition, the modifier i-hexadecyl alcohol®, a mixture of primary hexadecanols (a commercial product of Hoechst), was dissolved in the kerosine in a quantity of 0.5 mole per liter.

Extraction was carried out discontinuously at a) room temperature (20° to 25° C.) and b) 50° C.

in a ratio by volume of aqueous electrolyte solution to kerosine solution of 1:1. The quantities of impurity elements extracted as a function of the residence time (=contacting time) are shown in Table 1 below. The ratios by volume are shown in abbreviated form as the ratio of organic phase (O) to aqueous phase (A) or vice versa.

TABLE 1

| Dependence of extraction on residence time | | | | |
|---|---|---|---|---|
| Quantity extracted in g/l after mins | As | Fe | Sb | Bi |
| Room temp. Quantity extracted after | | | | |
| 3 | 3.3 | 0.17 | 0.17 | 0.11 |
| 5 | 4.0 | 0.19 | 0.17 | 0.11 |

TABLE 1-continued

| Dependence of extraction on residence time | | | | |
|---|---|---|---|---|
| Quantity extracted in g/l after mins | As | Fe | Sb | Bi |
| 10 | 4.5 | 0.22 | 0.20 | 0.11 |
| 20 | 6.3 | 0.19* | 0.19* | 0.10* |
| 30 | 6.8 | 0.17* | 0.20 | 0.09* |
| 40 | 7.2 | 0.16* | 0.20 | 0.09* |
| 60 | 7.4 | 0.15 | 0.19* | 0.09* |
| 50° C. Quantity extracted after | | | | |
| 3 | 5.0 | 0.19 | 0.16 | 0.10 |
| 5 | 5.8 | 0.19 | 0.16 | 0.10 |
| 10 | 6.7 | 0.15* | 0.16 | 0.10 |
| 15 | 7.2 | 0.19* | 0.15* | 0.08 |
| 20 | 7.7 | 0.21 | 0.16 | Not determined |

*Displacement phenomena appear through increasing extraction of As

Table 1 shows that the efficient extraction of As at room temperature requires relatively long residence times whereas the extraction of Sb, Bi and Fe takes place more efficiently with distinctly shorter residence times. At higher temperatures, there is a considerable improvement in the extraction of As so that shorter residence times are possible.

Example 2

Stripping of As, temperature and residence time

An organic phase obtained after extraction in accordance with Example 1 containing 0.5 mole/l of modifier (composition in g/l: 7.9 As; 0.22 Fe; 0.20 Sb; 0.11 Bi) was stripped with an aqueous copper sulfate solution (10 g of copper ions per liter; O:A ratio by volume 1:1).

As shown in Table 2, the residence times or the temperatures were changed; the pH value was kept constant at 2.2 (titration with sodium hydroxide).

TABLE 2

| Stripping of As; residence times, temperatures | | |
|---|---|---|
| Temperature in °C. | Residence times in mins. | Quantity extracted in % As |
| 25 | 10 | 22 |
| 50 | 2 | 32 |
| | 4 | 41 |
| | 8 | 50 |
| | 10 | 52 |
| | 15 | 57 |
| | 30 | 66 |
| | 60 | 72 |
| 70 | 10 | 74 |

It can be seen from Table 2 that the stripping of As is substantially linear with increasing temperature (residence time 10 mins.). However, in the interests of stability of the hydroxamic acid, temperatures below 70° C. are desirable. The absolute quantity of As stripped also increases with increasing residence time, relatively large quantities of As relative to the time expended being present after only about 20 to 30 minutes.

In principle, part of the impurity elements Sb (approximately 60 to 70 mg/l, corresponding to 30 to 40%) and Bi (8 to 15 mg/l, corresponding to 5 to 10%) is also stripped during the stripping of As under the defined conditions (T=50° C., residence time 2 to 60 minutes), although in absolute terms these are extremely small quantities.

Example 3

Stripping of As; modifier concentration

An organic phase of "Escaid® 120" containing per liter: 0.5 mole of hydroxamic acid according to Example 1, charged impurity elements (g/l: 7.9 As; 0.22 Fe; 0.20 Sb; 0.11 Bi) and varying quantities of i-hexadecyl alcohol according to Table 3 was treated as in Example 2 with an aqueous copper sulfate solution (10 g of copper ions per liter) in a ratio by volume of O:A of 1:1 over a residence time of 10 minutes at pH 2.2 and at a temperature of 50° C. Table 3 below shows the impurity elements remaining in the organic phase after stripping (in g/l) and, in brackets, the stripping in (%).

TABLE 3

| Modifier concentration in moles per liter | Stripping; modifier concentration |||| 
|---|---|---|---|---|
| | Organic phase (g/l) ||||
| | As | Fe | Sb | Bi |
| 0 | 5.3 (32) | 0.18 | 0.13 | 0.08 |
| 0.1 | 4.6 (42) | 0.14 | 0.12 | 0.09 |
| 0.25 | 4.2 (47) | 0.13 | 0.12 | 0.09 |
| 0.5 | 3.8 (52) | 0.12 | 0.12 | 0.08 |
| 1.0 | 3.2 (60) | 0.13 | 0.12 | 0.09 |

Example 4

Comparison As stripping with $CuSO_4/H_2O$ $CuSO_4$ solution (10 g of copper ions per liter) at pH 2.2 and distilled water at pH 3.3 were added in accordance with DE-A-38 36 731 to an organic phase of Escaid® 120 containing 0.5 mole/l of hydroxamic acid according to Example 1 and charged impurity elements in the usual quantities (As 7.9 g/l) and a) 0 b) 0.5 mole of i-hexadecyl alcohol per liter and treated for 60 minutes (residence time) at a temperature of 50° C. in accordance with Example 2. Table 4 below shows the quantity of As stripped in %.

TABLE 4

| As stripping with $CuSO_4$ by comparison with water ||| 
|---|---|---|
| | | Quantity of As stripped in % |
| pH = 2.2 $CuSO_4$ solution | a) Without modifier b) With modifier | 54 72 |
| pH = 3.3 Water | a) Without modifier b) With modifier | 8 31 |

It can be seen from Table 4 that better stripping results for As are always obtained with a copper sulfate solution with or without modifier.

Example 5

Stripping of Sb, Bi and Fe

Hydrochloric acid in varying concentrations (see Table 5) was added in a ratio by volume O:A of 1:1 to an organic phase of "Escaid®120" containing per liter 0.5 mole of hydroxamic acid according to Example 1 0.5 mole of i-hexadecyl alcohol (modifier) charged impurity elements (g/l): 7.9 As; 0.22 Fe; 0.20 Sb; 0.11 Bi. Stripping was carried out by shaking once for 2 minutes (residence time) at room temperature (20 to 25° C.). Table 5 below shows the quantities in percent of impurity elements stripped from the organic phase with HCl.

TABLE 5

| Stripping of Sb, Fe and Bi (in %) |||||
|---|---|---|---|---|
| Concentration of HCl in moles/l | Fe | Sb | Bi | As |
| 3 | 14 | 1 | 100 | 7 |
| 4 | 27 | 3 | 100 | 6 |
| 5 | 58 | 19 | 100 | 5 |
| 6 | 65 | 38 | 100 | 4 |
| 8 | 76 | 59 | 100 | 4 |

It can be seen from Table 5 that, under the defined conditions, Sb, Bi and Fe are efficiently stripped while As is hardly stripped, above all by hydrochloric acid containing 5 to 8 moles of hydrochloric acid per liter. The impurity elements can thus be recovered selectively and independently in combination with the stripping of As with the copper sulfate solution.

We claim:

1. A process for removing impurity elements selected from the group consisting of arsenic, antimony, iron, bismuth and mixtures thereof, from valuable metal containing aqueous acid solutions comprising:

(a) contacting the valuable metal containing aqueous acid solution with an organic solvent solution of a hydroxamic acid having the formula (I)

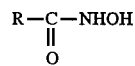

in which R is an alkyl and/or alkenyl radical containing 6 to 22 carbon atoms, a cyclo-alkyl radical or an aryl radical containing up to 19 carbon atoms for a sufficient time to transfer said impurity elements and the valuable metal from the valuable metal containing aqueous acid solution to said organic solvent solution of the hydroxamic acid, which forms an aqueous phase and an organic phase containing the impurity elements and the valuable metal;

(b) separating the organic phase from the aqueous phase; and (c) contacting the organic phase from step (b) with an aqueous solution to strip the impurity elements from the organic phase, wherein the aqueous solution to strip the impurity metal elements selected from the group consisting of antimony, iron and bismuth comprises an aqueous solution of a complexing acid which complexes with one or more of the antimony, iron or bismuth impurity elements to remove the antimony, iron or bismuth from the organic phase and wherein the aqueous solution to strip any arsenic impurity element from the organic phase comprises an aqueous valuable metal containing solution having a higher pH value relative to the aqueous acid solution in stage (a) containing a valuable metal to remove the arsenic from the organic phase, in which the removal of the arsenic impurity element is carried out simultaneously with or subsequent to the removal of the metal elements of antimony, iron or bismuth;

(d) recovering the impurity elements from the aqueous stripping solutions of step (c) after separation of the stripping solution from the organic phase; and (e) recovering the valuable metal from the organic phase.

2. A process as defined in claim 2 wherein the valuable metal containing aqueous acid solution is a copper containing electrolyte solution.

3. A process as defined in claim 2 wherein the acid solution is an aqueous sulfuric acid copper electrorefining solution.

4. A process as defined in claim 1 in which the organic solvent solution comprises a water-insoluble organic solvent containing said hydroxamic acid (I) wherein the organic solvent is selected from the group of hydrocarbons or mixtures thereof, chlorinated hydrocarbons, ketones and ethers.

5. A process as defined in claim 4 in which said organic solvent is kerosine.

6. A process as defined in claim 4 in which the R group in the hydroxamic acid is a branched, saturated alkyl radical containing about 6 to 22 carbon atoms.

7. A process as defined in claim 6, in which R is a neo-alkyl radical having the formula (II):

in which the sum of the carbon atoms in $R^1$, $R^2$ and $R^3$ is from 6 to 18.

8. A process as defined in claim 6 in which R contains 7 to 19 carbon atoms.

9. A process as defined in claim 1 wherein the hydroxamic acid is present in the organic solvent solution in a concentration of about 0.1 to about 2.0 moles/l of organic solution.

10. A process as defined in claim 9, wherein the hydroxamic acid is present in a concentration of 0.3 to 1.0 moles/l of organic solution.

11. A process as defined in claim 1 wherein the organic solvent solution of the hydroxamic acid further comprises a modifier.

12. A process as defined in claim 11, wherein the modifier is selected from the group consisting of long chain branched alcohols, phenols and esters thereof.

13. A process as defined in claim 12 wherein the modifier is present in a concentration of about 0.01 to about 2.0 mole/l of organic phase.

14. A process as defined in claim 13 wherein the modifier is present in a concentration of 0.1 to 1 mole/l or organic phase.

15. A process as claimed in claim 1 wherein the valuable metal containing aqueous acid solution is contacted in step (a) with the organic solvent solution of the hydroxamic acid optionally containing a modifier for a period of about 1 to about 60 minutes.

16. A process as claimed in claim 15 wherein said period is from 5 to 20 minutes.

17. A process as defined in claim 1 wherein the aqueous valuable metal containing acid solution is contacted with the organic solvent solution of the hydroxamic acid at a temperature of about 20° to about 70° C.

18. A process as defined in claim 17 wherein the temperature is from 30° to 60° C.

19. A process as defined in claim 1 in which the aqueous valuable metal containing solution contacted in step (a) has a pH value below 0.

20. A process as defined in claim 1 in which the acid in the aqueous complexing acid solution in step (c) is selected from the group consisting of oxalic acid, hydrochloric acid and a phosphonic acid.

21. A process as defined in claim 1 in which the acid in the aqueous complexing acid solution in step (c) is hydrochloric acid.

22. A process as defined in claim 21 in which contact of the aqueous phase containing hydrochloric acid and the organic phase in step (c) is maintained for a period of about 30 seconds to about 10 minutes.

23. A process as defined in claim 22 wherein the time period is 1 to 3 minutes.

24. A process as defined in claim 21 wherein the ratio by volume of the aqueous hydrochloric acid solution to the organic phase is about 1:10 to about 10:1.

25. A process as defined in claim 24 wherein the ratio is 1.5:1 to 1:1.5.

26. A process as defined in claim 1 wherein step (c) is carried out at a temperature of about 20° to about 60° C.

27. A process as defined in claim 26 wherein the temperature is 20° to 30° C.

28. A process as defined in claim 1 wherein the arsenic is stripped from the organic phase in step (d) with a copper ion solution at a pH maintained at about 1.5 to about 2.5.

29. A process as defined in claim 28 wherein the copper ion solution has an at least equimolar concentration of copper ion based on the arsenic ions in the organic phase up to a concentration of 40 g/l of copper in the aqueous phase.

30. A process as defined in claim 28 in which the ratio by volume of the aqueous solution containing copper ions and the organic solvent solution containing arsenic is about 1.5:1 to about 1:1.5.

31. A process as defined in claim 28 in which contact of the aqueous copper ion containing solution and the organic solvent solution containing arsenic ions is maintained for a period of about 1 to about 60 minutes.

32. A process as defined in claim 31 wherein the time period is 5 to 30 minutes.

33. A process as defined in claim 1 wherein, after removal of the impurity elements in steps (c) and (d) and recovery of the valuable metal from the organic phase, the organic solvent solution containing the hydroxamic acid is returned for reuse in step (a).

* * * * *